Apr. 17, 1923.
A. B. SHULTZ
1,451,964
BALL JOINT
Filed Sept. 28, 1921
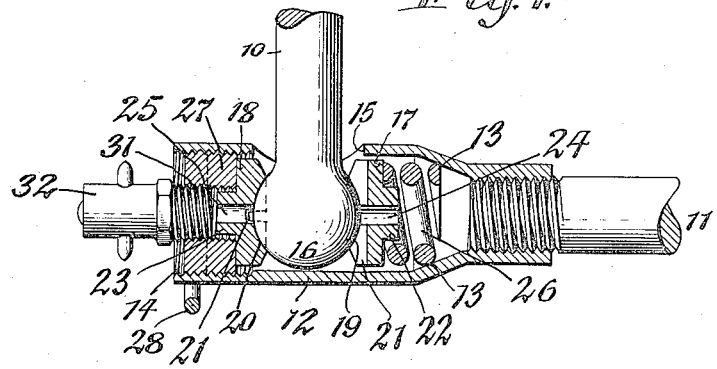
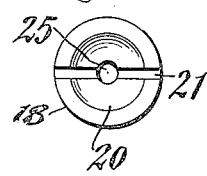 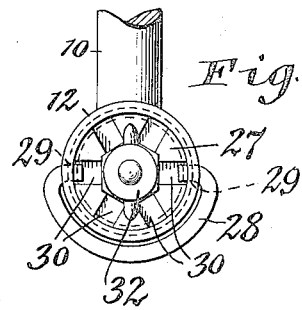
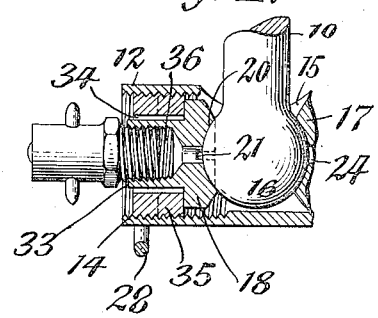
Inventor
Albert B. Shultz
by Geyer & Popp
Attorneys Patented Apr. 17, 1923.

1,451,964

UNITED STATES PATENT OFFICE.

ALBERT B. SHULTZ, OF BUFFALO, NEW YORK.

BALL JOINT.

Application filed September 28, 1921. Serial No. 503,790.

*To all whom it may concern:*

Be it known that I, ALBERT B. SHULTZ, a citizen of the United States, residing in Buffalo, in the county of Erie and State of New York, have invented new and useful Improvements in Ball Joints, of which the following is a specification.

This invention relates to a ball joint and has for its object the provision of simple and efficient means whereby the co-operating bearing surfaces of the joint may be easily and readily lubricated.

In the accompanying drawings:

Figure 1 is a longitudinal section of my improved ball joint. Figure 2 is an end view of the same. Fig. 3 is a side view of the outer bearing disk. Figure 4 is a fragmentary longitudinal section showing a modification of my invention.

Similar characters of reference indicate corresponding parts in the several views.

In the present instance, my improved ball joint is shown in connection with a rock arm 10 and a longitudinally movable shifting rod 11, but it is to be understood that the same may be used in connection with other installations.

12 represents the tubular body of my improved ball joint which has its inner end provided with an internal shoulder 13 and connected by a screw joint with the rod 11, while its outer end is provided with an internal screw thread 14 and its intermediate part is provided with a lateral opening 15, through which the rock arm 10 projects. 16 is a ball formed on or attached to the rock arm and arranged in the central part of the tubular body. Within the tubular casing and on opposite sides of the ball are arranged inner and outer bearing disks or members 17, 18 which are provided on their opposing sides with concave seats 19, 20, respectively, which engage with opposite sides of the ball. Each of these bearing disks is provided with a groove 21 extending across its seat, whereby any lubricant delivered to this seat is distributed over the same and the co-operating surfaces are caused to wear uniformly and work evenly with a minimum of friction. These bearing disks are also provided on the sides opposite the seats with central reduced necks 22, 23 and with central openings or passages 24, 25, extending axially through the same, as shown in Figure 1. Within the inner part of the tubular body is arranged a spring 26, preferably of helical form which engages at one end with the internal shoulder of the body while its other end engages the rear side of the inner bearing disk and receives the neck thereof, so that these parts are centered relatively to each other. 27 represents a bushing or nut arranged in the outer part of the tubular bushing and having an external screw thread engaging with the internal thread 14 thereof and having its inner or front end engaging the rear end of the outer bearing disk. By screwing the bushing more or less into the tubular body, the two bearing disks and the ball may be caused to engage each other under the desired pressure and after such adjustment the bushing is held in position by a bow shaped spring cotter 28 having its ends arranged in openings 29 on diametrically opposite sides of the tubular body and engaging with one or another of a pair of notches 30 formed in an annular row at the outer end of the bushing.

As shown in Fig. 1, the bushing is provided with a central axial opening 31 which receives the reduced neck 23 of the outer bearing disk and holds these parts in a central position relatively to each other and facilitates assembling of the parts. By making this outer bearing disk separate from the adjusting bushing, this disk may be hardened independently of the bushing and thereby avoiding distortion of the bushing as well as liability of breaking off the notched parts of its outer end as would be the case if the bushing and outer bearing disk were made in one piece and hardened together.

The lubricant is supplied to the outer bearing disk and then works around the ball to the other bearing disk, so that all the working surfaces are lubricated. In the construction shown in Fig. 1, the lubricant is supplied to the openings in the bushing and outer disk by a lubricating nipple 32, the rear or inner end of which screws into the outer end of the bushing and its outer end is adapted to be connected with a grease gun or pump of any suitable construction, so that upon operating the gun, grease will be conducted to the joint between the ball and the adjacent bearing surface.

If desired, the lubricant nipple may be connected directly with the outer bearing disk, as shown in Fig. 4, in which case the latter is provided on its outer side with a reduced neck 33 which projects outwardly through an unthreaded opening 34 in the center of the bushing 35 and is provided with an axial threaded opening 36 into which the inner threaded end of the lubricating nipple is screwed.

In either case the lubricant may be supplied by pressure from a gun to the journal or pivotal surfaces of the joint with ease and facility so as to thoroughly lubricate the same.

I claim as my invention:

1. A ball joint comprising a tubular body, inner and outer bearing disks arranged on said body and each provided with a concave seat, and a distributing groove extending across said seat and a shank provided with a ball engaged on its opposite sides by the seats of said disks.

2. A ball joint comprising a tubular body having an internal shoulder at one end and an internal screw thread at its opposite end, a helical spring engaging one end with said shoulder, an inner bearing disk provided on one side with a seat and having its opposite side engaging the opposite end of said spring and provided with a reduced neck arranged within the adjacent part of the spring, a bushing having an external screw thread engaging with the internal thread of said body and provided with a central opening, and a bearing disk provided on one side with a seat and having its opposite side engaging said bushing and provided with a reduced neck which is arranged in the opening of said bushing.

3. A ball joint comprising a tubular body, an inner bearing disk supported within the body, an outer bearing disk arranged within the body, and provided with a central opening leading from the rear to the front side of the same, a shank having a ball engaged on its opposite sides by said bearing disks, a bushing having an external screw thread engaging said internal thread of the body and having a central threaded opening communicating with the opening of said outer bearing disk, and a lubricating nipple secured in the threaded opening of said bushing.

ALBERT B. SHULTZ.